United States Patent [19]

Gellert

[11] Patent Number: 4,576,567
[45] Date of Patent: Mar. 18, 1986

[54] INJECTION MOLDING SYSTEM HAVING AN INSULATION SLEEVE

[76] Inventor: Jobst U. Gellert, 7A Prince St., Georgetown, Ontario, Canada, L7G 2X1

[21] Appl. No.: 537,054

[22] Filed: Sep. 29, 1983

[30] Foreign Application Priority Data

Sep. 12, 1983 [CA] Canada .................................. 436502

[51] Int. Cl.[4] ............................................. B29C 45/03
[52] U.S. Cl. ..................................... 425/549; 425/568
[58] Field of Search ............... 425/547, 548, 549, 550, 425/564, 565, 566, 567, 568

[56] References Cited

U.S. PATENT DOCUMENTS 2,500,401  3/1950  Cossette ............................. 425/549
3,520,026  7/1970  Stidham et al. ..................... 425/547
3,800,027  3/1974  Tsutsumi ............................ 425/567

Primary Examiner—Donald Czaja
Assistant Examiner—V. Fischbach
Attorney, Agent, or Firm—Riches, McKenzie & Herbert

[57] ABSTRACT

This invention relates to an injection molding system of the type wherein a heated probe is centrally located in the hot runner passage. The probe has a pair of circumferentially spaced melt channels, each with an upstream portion which branch out from a common central inlet to a downstream portion along the outer surface of the probe. The probe is seated in a well in the cavity plate and a hollow cylindrical insulating sleeve is located between the downstream portion of the probe and the wall of the well. The outer surface of the probe and the inner surface of the insulating sleeve have longitudinally extending grooves which are aligned to form the downstream portions of the melt channels. The insulating sleeve is formed of a thermoplastic material with low thermal conductivity and a high melting temperature. In addition to insulating, the sleeve provides the advantage that it avoids the space between the probe and the well wall filling with melt which often results in problems on color changes and the degradation of the stagnant material which is trapped.

7 Claims, 5 Drawing Figures

INJECTION MOLDING SYSTEM HAVING AN INSULATION SLEEVE

BACKGROUND OF THE INVENTION

This invention relates to injection molding and more particularly to an improved hot runner system with a central integral heated probe.

In the past, it has been known to provide injection molding systems with elongated probes with internal heaters which the melt flows around on its way to the gate. One of these is shown in the applicant's previous U.S. Pat. No. 4,376,244 entitled "Injection Molding Heated Probe" which issued Mar. 8, 1983 which discloses a probe with a somewhat similar integral construction. More recently, the applicant found it is advantageous to provide externally open melt channels on the surface of the probe and the structure is shown in the applicant's U.S. patent application Ser. No. 453,572 entitled "Method of Manufacture of an Injection Molding Integral Heated Probe" which was filed Dec. 27, 1982. However, these prior systems have the disadvantage that, during operation, the insulative space that is provided between the hot probe and the surrounding cool melt necessarily fills with melt. It is, of course, well known to use melt as an insulator and this arrangement works well for some applications and some materials. The problem is that the melt in this space around the probe solidifies adjacent the cool outer wall, but does not entirely solidify adjacent the heated probe. Thus, when the material or even the colour of the material being molded changes, the previous material remains trapped in this space and introduces contamination into the molded product for a considerable period of time. Furthermore, with the trend to molding more difficult and less stable materials, it has been found that materials such as some heat sensitive flame retardant materials cannot satisfactorily be molded with these previous systems because of degradation of the stagnant material which is trapped in this space around the probe.

As may be seen in FIGS. 4 and 5 of Mold-Masters Limited brochure 3/82 printed in 1982, the applicant has previously attempted to overcome these problems in systems in which the melt passage extends centrally through a heated nozzle by filling the space around the nozzle with TEFLON (Trade Mark of DuPont for polytetrafluoroethylene insulation). While the use of a central heated probe which the melt flows around, rather than a heated nozzle with a central bore provides advantages in many instances, it has not previously been thought possible to overcome these problems because the melt flow occurs through this same space where the problems arise. Earlier solutions to these problems for systems having a center runner are shown in the applicant's U.S. Pat. Nos. 4,043,740 which issued Aug. 23, 1977 and 4,279,588 which issued July 21, 1981 which disclose seals bridging the gap around the gate to prevent the space around the nozzle filling with melt.

Another known practice for dealing with this problem is to first shoot a different material with a high melting temperature such as NYLON 66 through the system. This does fill the dead spots and avoid stagnation, but it has the disadvantage that it takes time to do and the whole system has to be cleaned if it is not done right or has to be removed later.

SUMMARY OF THE INVENTION

Accordingly, it is an object of the present invention to at least partially overcome these problems for a system with a central heated probe by preventing the space around the outside of the heated probe from filling with melt.

To this end, in one of its aspects, the invention provides a hot runner injection molding system with a hot runner passage extending to convey pressurized melt from a molding machine to a gate in a cooled cavity plate leading to a cavity, and having an integral elongated heated probe seated in a well in the cavity plate, the probe having an outer surface and the well in the cavity plate having a wall which extends around said outer surface to form a space therebetween, the probe having at least one generally longitudinally extending melt channel through which the hot runner passage extends, wherein the outer surface of the probe has at least one longitudinally extending outwardly open groove, and an insulating sleeve is located in the space between the probe and the cavity plate, the insulating sleeve having an inner surface abutting the outer surface of the probe, the inner surface of the sleeve having at least one longitudinally extending inwardly open groove which is in alignment with said outwardly open groove extending along the outer surface of the probe to form at least a portion of the melt channel.

Further objects and advantages of the invention will appear from the following description taken together with the accompanying drawings.

DESCRIPTION OF THE PREFERRED EMBODIMENTS

Figure 1:
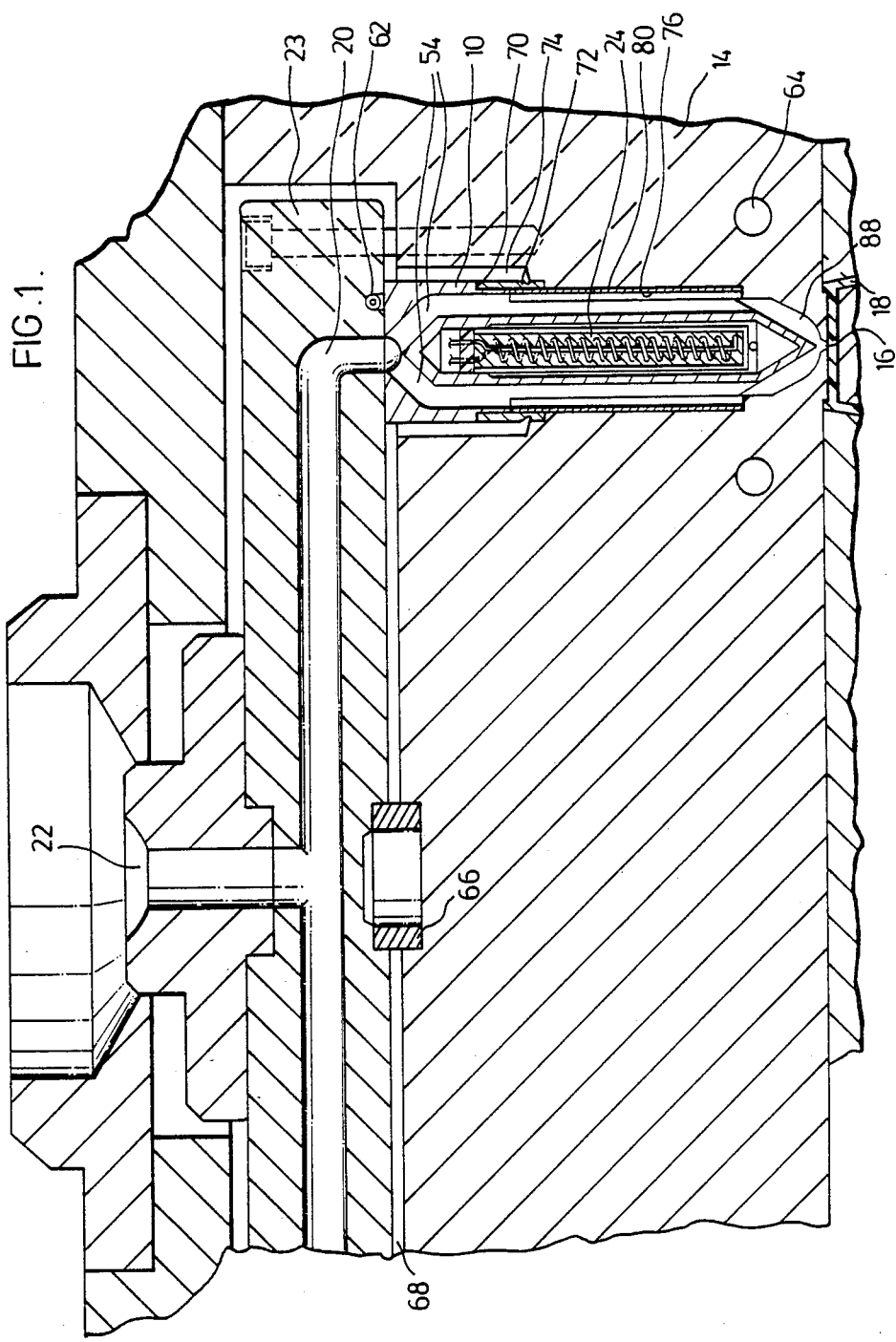
FIG. 1 is a sectional view of a portion of an injection molding system showing a preferred embodiment of the invention.

Reference is first made to FIG. 1 which shows a portion of a multi-cavity injection molding system having a number of elongated internally heated probes 10. Each probe 10 is seated in a well 12 in a cavity plate 14 in alignment with a gate 16 through the cavity plate 14 leading to a cavity 18. Hot runner passages 20 branch from a common inlet 22 to extend through a manifold 23 and past each probe 10 to a respective gate 16.

Figure 4:
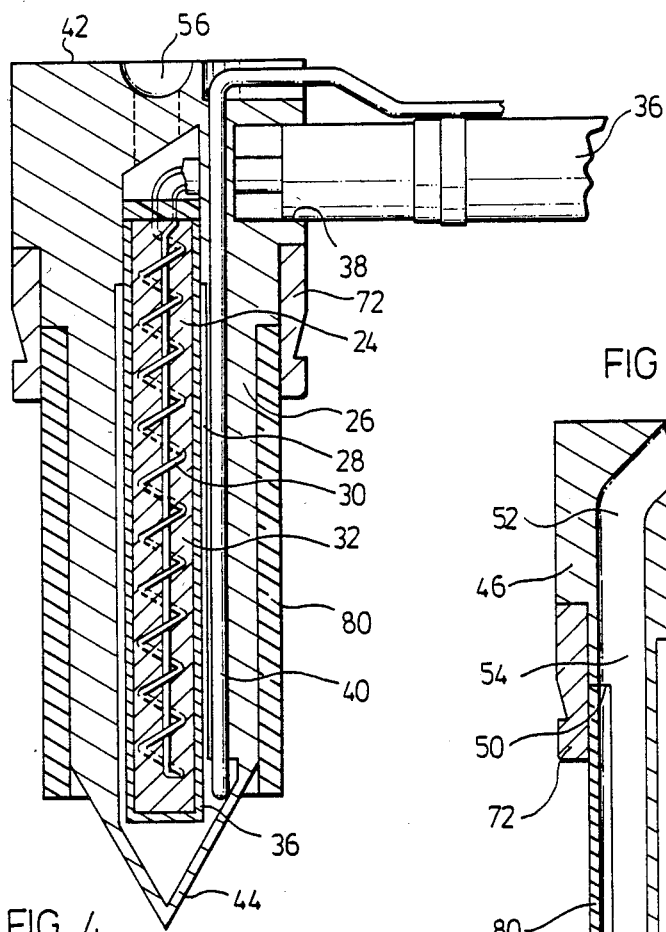
FIG. 4 is a sectional view of the heated probe and insulating sleeve taken along line 4—4 in FIG. 3.
Figure 5:
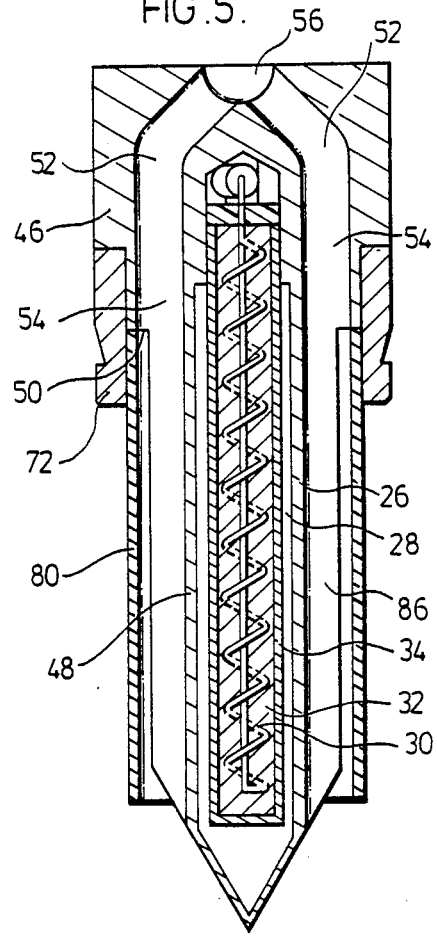
FIG. 5 is a similar sectional view taken along line 5—5 in FIG. 3.
Figure 3:
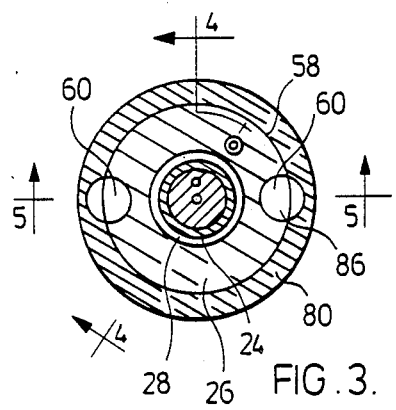
FIG. 3 is a cross-sectional view of the heated probe and insulating sleeve shown in FIG. 1.

As may more clearly be seen in FIGS. 3–5, each probe 10 has a cartridge heater 24 centrally sealed in a tool steel outer body 26 with a copper portion 28 cast into a space between them to provide an integral structure. The tool steel outer body 26 has sufficient strength and corrosion resistance to withstand the effect of the hot pressurized melt and the copper portion 28 is highly thermally conductive to transfer heat from the cartridge heater 24 to the outer body 26 evenly along the length of the probe 10. While other types of heaters may be used, in this embodiment, the cartridge heater 24 has a conventional structure with an electrical heating coil 30 extending through magnesium oxide heat transfer material 32 inside a generally cylindrical outer metal casing 34. As is well known, the heater 24 is made by inserting the heating coil 30 and a magnesium oxide ceramics into the casing 34, and then swaging the casing 34 to sinter the ceramic to provide magnesium oxide powder around the heating coil 30 to improve heat transfer. The heating coil 30, of course, has an insulated electrical terminal 36 which extends out through an opening 38 in the outer body 26 to a power source (not shown). As more clearly described in the applicant's U.S. patent application Ser. No. 453,572 referred to above, the probe 10 also has a thermocouple 40 which extends from the upstream end 42 into the highly conductive copper portion 28 to accurately measure the temperature adjacent the downstream pointed tip end 44 of the probe 10.

The probe 10 has an upstream portion 46 and a smaller diameter downstream portion 48 which meet at shoulder 50. A pair of upstream portions 52 of melt channels 54 extend diagonally outward in opposite directions from a common inlet 56 at the upstream end 42 of the probe. The outer surface 58 of the downstream portion 48 of the probe 10 extending between the shoulder 50 and the pointed tip end 44 is generally cylindrical with a pair of outwardly open grooves 60 which extend longitudinally on opposite sides and connect with the upstream portions 52 of the melt channels 54.

Close temperature control of the melt has become increasingly critical as a wider range of materials are being molded. In the embodiment shown, the steel manifold is heated to a desired temperature by an electrical heating element 62 which has been integrally cast into it as described in the applicant's U.S. patent application Ser. No. 390,174 entitled "Injection Molding Manifold Member and Method of Manufacture" which was filed June 21, 1982. Each probe 10 is, of course, heated by a cartridge heater 24 as described above, and the cavity plate 14 is cooled in a conventional manner by cooling channels 64. It is well known that the hot manifold 23 and probe 10 must be insulated from the cool cavity plate 14 or other cool components of the mold and a hollow locating ring 66 seated between the manifold 23 and the cavity plate 14 provides an insulative air gape 68 between them. Similarly, the upstream portion 46 of the probe 10 has a second bearing shoulder 70 which sits on a cylindrical insulation bushing 72 to locate the probe 10 in the well 12 and provide an insulative space 74 between it and the wall 76 of the well 12.

Figure 2:
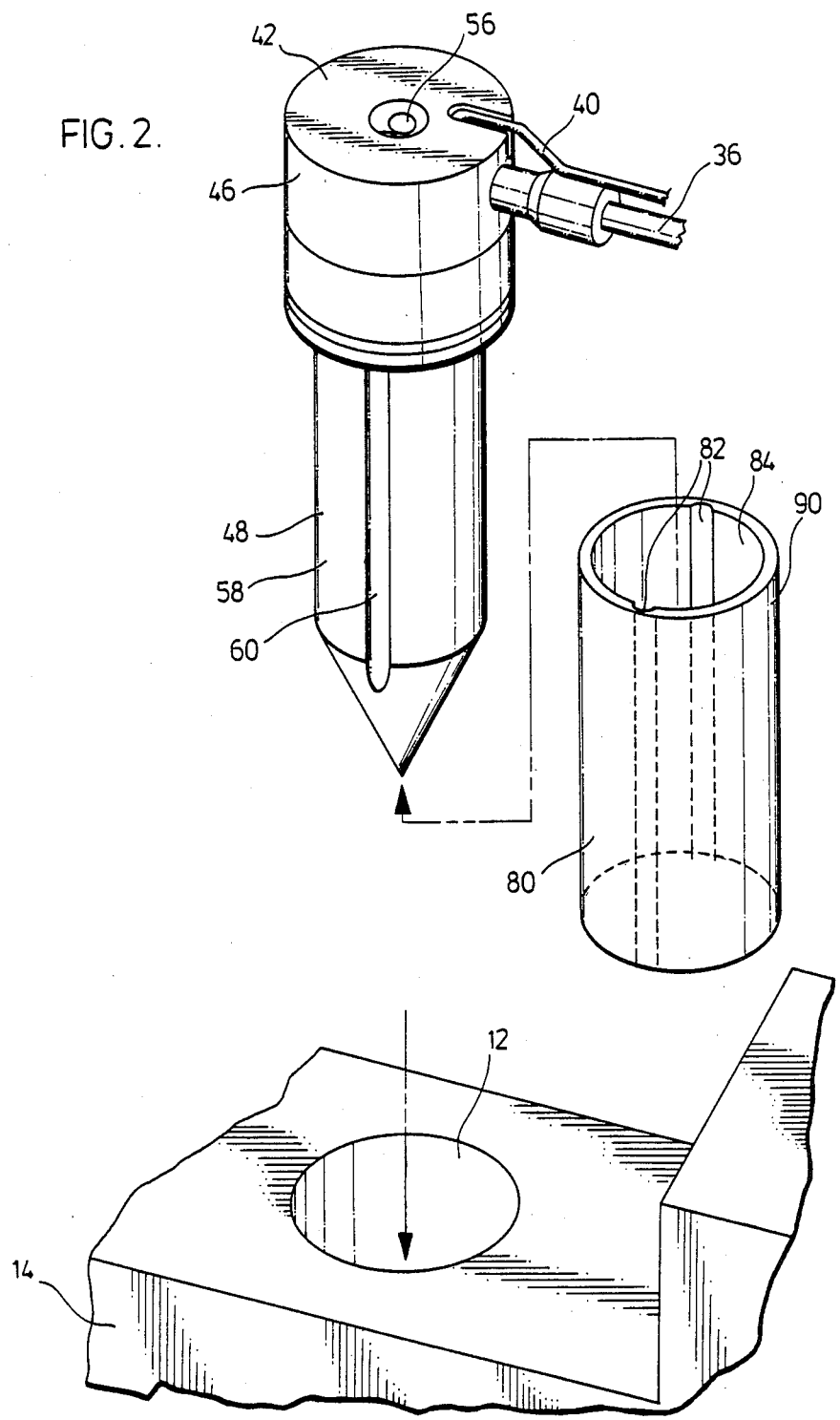
FIG. 2 is an exploded isometric view of a portion of the system shown in FIG. 1, illustrating the location of the insulating sleeve.

In the present system, the applicant has unexpectedly found that the portion of this space 74 between the cylindrical outer surface 58 of the downstream portion 48 of the probe 10 and the surrounding cylindrical wall 76 of the well 12 may be filled with an insulating sleeve 80. As may clearly be seen in FIG. 2, the insulating sleeve 80 is generally cylindrical in shape and has a pair of grooves 82 extending longitudinally on opposite sides of its inner surface 84. The insulating sleeve 80 is molded of a thermoplastic material having a high melting temperature and low thermal conductivity such as ULTEM (Trade Mark of General Electric Company for a polyetherimide resin). The sleeve 80 is made just large enough to fit over the downstream portion 48 of the probe 10 and into the well 12 in the cavity plate 14. The sleeve 80 is assembled with the inwardly open grooves 82 in its inner surface 84 in alignment with the outwardly open grooves 60 in the outer surface 58 of the downstream portion 48 of the probe to form downstream portions 86 of the melt channels 54. The downstream portions 86 of the melt channels 54 connect respectively with the upstream portions 52 of the melt channels 54 to convey the pressurized melt to the portion of the space 74 adjacent the tip end 44 of the probe adjacent the gate 16. As the probe 10 is heated to operating temperature, it expands to compress the sleeve 80 between it and the cooled well wall 76 which maintains the grooves 60,82 in alignment and prevents stagnant material forming in the heated zone adjacent the downstream portions 86 of the melt channels. In one embodiment of the invention, both the inner surface 84 and the outer surface 90 of the insulating sleeve are treated with a dry film lubricant such as DICRONITE (Trade Mark of Lubrication Sciences, Inc. for tungsten disulfide coating) to facilitate its removal after use, if necessary.

In use, the system is assembled as shown and power applied to heat the manifold 23 and probe 10 to a predetermined operating temperature. Hot pressurized melt is then introduced into the melt passages 20 through recessed inlet 22 from a molding machine (not shown) according to a predetermined cycle. Melt flowing through each of the passages 20 enters the probe 10 through inlet 56 where it branches into one of the upstream portion 52 of one of the melt channels 54 and then flows into the respective downstream portion 86 and out into the portion 88 of the space 74 adjacent the tip end 44 of the probe 10, before flowing through the gate 16 into the cavity. The insulative sleeve 80 with the longitudinal grooves 82 forms the downstream portions 86 of the melt channels 54 and prevent the melt from filling the entire space 74 between the downstream portion 48 of the probe 10 and the well wall 76. When the cavity 18 is filled, flow ceases and the pressure is relieved by the molding machine after a short packing period. The mold is then opened to eject the molded products and the process is repeated.

If the colour of the material being molded is changed, elimination of the previous material to avoid colour contamination is easily achieved by nomentarily turning off the cooling water through cooling channels 64. This causes the temperature of the melt near the gate 16 to rise which removes an inside layer of the previously solidified melt. When the flow of cooling water is resumed, this layer is replaced by a layer of the new colour so that further colour problems are avoided. This procedure has the advantage that other temperatures of the system need not be changed and thus the interruption of productive operation is minimized.

While the description of this system has been given with respect to a particular embodiment, it is not to be construed in a limiting sense. Variations and modifications will now occur to those skilled in the art. In particular, it is apparent that a wide variety of molding system configurations may utilize this concept. For instance, other plates may be positioned between the manifold and the cavity plate in different mold arrangements, or the manifold could be eliminated entirely in a single heated probe arrangement.

Furthermore, the probe can have different types of tips to provide different types of gating such as edge gating. Reference is made to the appended claims for a definition of the invention.

What I claim is:

1. In a hot runner injection molding system with a hot runner passage extending to convey pressurized melt from a molding machine to a gate in a cooled cavity plate leading to a cavity, and having an integral elongated heated probe seated in a well in the cavity plate, the probe having an outer surface and the well in the cavity plate having a wall which extends around said outer surface to form a space therebetween, the probe having at least one generally longitudinally extending melt channel which the hot runner passage extends, the improvement wherein the outer surface of the probe has at least one longitudinally extending outwardly open groove, and a thermal insulating sleeve is located in the space between the probe and the cavity plate, the insulating sleeve having an inner surface abutting the outer surface of the probe, the inner surface of the sleeve having at least one longitudinally extending inwardly open groove which is in alignmemt with said outwardly open groove extending along the outer surface of the probe to form at least a portion of the melt channel, the insulating sleeve being formed of a plastic material having a melting temperature substantially higher than that of the melt.

2. An injection molding system as claimed in claim 1 wherein the at least one melt channel has an upstream portion which extends through the probe and is enclosed by the probe and which connects with the said portion of the melt channel formed between the probe and the insulating sleeve.

3. An injection molding system as claimed in claim 2 wherein the probe has a tip end extending towards the gate in the cavity plate, and the insulating sleeve does not extend into the space between the probe and the cavity plate adjacent the tip end of the probe.

4. An injection molding system as claimed in claim 3 wherein the probe has at least two circumferentially spaced melt channels which branch out from a common inlet.

5. An injection molding system as claimed in claim 4 wherein the insulating sleeve is generally cylindrical shaped and extends around a downstream portion of the probe having a generally cylindrical outer surface, and is received in the well in the cavity plate having a generally cylindrical wall.

6. An injection molding system as claimed in claim 1 wherein the insulating sleeve is formed of polyetherimide resin.

7. An injection molding system as claimed in claim 1 wherein at least a portron of the insulating sleeve is treated with a dry film lubricant coating to facilitate its removal following use.

* * * * *